(12) United States Patent
Felippone et al.

(10) Patent No.: US 11,472,575 B2
(45) Date of Patent: Oct. 18, 2022

(54) SYSTEM AND METHOD FOR TESTING CONTROL LOGIC FOR A PROPELLER OF A GAS TURBINE ENGINE

(71) Applicant: GE Avio S.r.l., Rivalta di Torino (IT)

(72) Inventors: Felice Felippone, Rivalta di Torino (IT); Stefano Ettorre, Bari (IT); Simone Castellani, Viareggio (IT)

(73) Assignee: GE AVIO S.R.L., Rivalta di Torino (IT)

( * ) Notice: Subject to any disclaimer, the term of this patent is extended or adjusted under 35 U.S.C. 154(b) by 538 days.

(21) Appl. No.: 16/490,814

(22) PCT Filed: Mar. 1, 2018

(86) PCT No.: PCT/EP2018/055095
§ 371 (c)(1),
(2) Date: Sep. 3, 2019

(87) PCT Pub. No.: WO2018/158392
PCT Pub. Date: Sep. 7, 2018

(65) Prior Publication Data
US 2020/0010219 A1    Jan. 9, 2020

(30) Foreign Application Priority Data

Mar. 2, 2017  (EP) ..................................... 17425021

(51) Int. Cl.
*B64F 5/60*      (2017.01)
*F02C 9/58*      (2006.01)
(52) U.S. Cl.
CPC ................ *B64F 5/60* (2017.01); *F02C 9/58* (2013.01); *F05D 2260/83* (2013.01); *F05D 2270/021* (2013.01)

(58) Field of Classification Search
None
See application file for complete search history.

(56) References Cited

U.S. PATENT DOCUMENTS

| 4,993,919 A | 2/1991 | Schneider |
|---|---|---|
| 5,019,006 A | 5/1991 | Schneider et al. |

(Continued)

FOREIGN PATENT DOCUMENTS

| EP | 0392968 A2 | 10/1990 |
|---|---|---|
| EP | 0394181 A2 | 10/1990 |

OTHER PUBLICATIONS

PCT ISR Corresponding to PCT/EP2018/055095 on May 4, 2018.

*Primary Examiner* — Michael Lebentritt
(74) *Attorney, Agent, or Firm* — Dority & Manning, P.A.

(57) ABSTRACT

A method (600) for testing control logic for a propeller driven by a gas turbine engine of an aircraft includes overriding (602) a signal indicating the aircraft is operating in a ground mode. The method can further include testing (604) minimum pitch protection logic when the signal is overridden; determining (606) the gas turbine engine is operating at a ground fine setting; restoring (608) the signal to an original state in which the signal indicates the aircraft is operating in the ground mode; modifying (610) pitch protection logic; determining (614) the propeller is operating at an overspeed condition; and testing (616) the propeller overspeed protection logic. In addition, the method can also determine (612) the propeller is operating at a low pitch condition when the gas turbine engine is operating at the ground fine setting.

20 Claims, 9 Drawing Sheets (56) References Cited

U.S. PATENT DOCUMENTS

| | | | |
|---|---|---|---|
| 5,029,091 A | | 7/1991 | Schneider et al. |
| 5,897,293 A | * | 4/1999 | Arel ...................... B64C 11/303 |
| | | | 416/49 |
| 5,984,234 A | * | 11/1999 | Brouwer ............... B64C 1/1407 |
| | | | 244/129.5 |
| 6,059,528 A | * | 5/2000 | Danielson ............... B64C 11/40 |
| | | | 416/61 |
| 10,981,662 B2 | * | 4/2021 | Ettorre .................... B64C 11/34 |
| 2001/0012989 A1 | * | 8/2001 | Gunderson .............. B64F 5/60 |
| | | | 703/6 |
| 2011/0208400 A1 | * | 8/2011 | Lickfold ................... F02C 9/44 |
| | | | 701/100 |
| 2014/0244051 A1 | * | 8/2014 | Rollins ................ F04D 27/002 |
| | | | 700/282 |
| 2015/0251770 A1 | * | 9/2015 | Bisson ...................... F02C 9/42 |
| | | | 244/58 |
| 2021/0206474 A1 | * | 7/2021 | Danielson ............... B64C 11/30 |

* cited by examiner

SYSTEM AND METHOD FOR TESTING CONTROL LOGIC FOR A PROPELLER OF A GAS TURBINE ENGINE

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter relates generally to gas turbine engines used for aircraft.

BACKGROUND

A gas turbine engine of an aircraft generally includes, in serial flow communication, a gas generator compressor, a combustor, a gas generator turbine, and a power turbine. The combustor generates combustion gases that are channeled in succession to the gas generator turbine where they are expanded to drive the gas generator turbine. Then, the combustion gases are channeled to the power turbine where they are further expanded to drive the power turbine. The gas generator turbine is coupled to the gas generator compressor via a gas generator shaft, and the power turbine is coupled to a propeller via a power turbine shaft.

In operation, the propeller can be driven by the gas turbine engine to generate thrust for the aircraft. However, due to changes in the airspeed and/or rotational speed of the power turbine shaft, the rotational speed of the propeller can operate at an overspeed condition in which the propeller operates beyond its design limits. This is undesirable, because rotating the propeller at a speed that is beyond its design limit can damage the propeller, the gas turbine engine, or both. Accordingly, the aircraft generally includes a propeller overspeed protection system to govern the speed at which the propeller operates.

Testing operation of the propeller overspeed protection system currently requires a substantial amount of involvement from a pilot of the aircraft. More specifically, the pilot must press a switch on the instrument control panel to initiate testing of the propeller overspeed protection system. In addition, the pilot must continue to press the switch throughout the duration of testing, and must verify operation of the propeller overspeed protection system via one or more instrument gauges located on the instrument control panel.

BRIEF DESCRIPTION

Aspects and advantages of the invention will be set forth in part in the following description, or can be apparent from the description, or can be learned through practice of the invention.

In one example embodiment, a system and method for testing control logic for a propeller driven by a gas turbine engine of an aircraft is provided. The system can include a speed sensor and a pitch angle sensor. In some embodiments, the speed sensor can measure a rotational speed of the propeller, and the pitch angle sensor can measure a pitch angle of a blade of the propeller. The system can also include one or more processors and one or more memory devices. The processor(s) can be communicatively coupled to both the speed sensor and the pitch angle sensor. The memory device(s) store computer-readable instructions that, when executed by the processor(s), cause the processor(s) to perform operations, such as those included in the method more fully described below.

The method can include overriding, by one or more controllers, a signal indicating the aircraft is operating in a ground mode. In various embodiments, overriding the signal can include manipulating, by the one or more controllers, the signal to indicate the aircraft is operating in a flight mode.

The method can also include testing, by the one or more controllers, minimum pitch protection logic when the signal is overridden. In various embodiments, testing the minimum pitch protection logic can include obtaining a pitch angle measurement indicating a pitch angle of the propeller. In addition, testing the minimum pitch protection logic can include comparing the pitch angle measurement to a reference pitch angle. The minimum pitch protection logic is functional when the pitch angle measurement is greater than or equal to the reference pitch angle. In contrast, the minimum pitch protection logic is dysfunctional when the pitch angle measurement is less than the reference pitch angle.

In alternative embodiments, testing the minimum pitch protection logic can include obtaining a first propeller speed measurement indicating a rotational speed of the propeller. In addition, testing the minimum pitch protection logic can include obtaining a second propeller speed measurement indicating the rotational speed of the propeller. Still further, testing the minimum pitch protection logic can include comparing the first and second propeller speed measurements. The minimum pitch protection logic is functional when the first and second propeller speed measurements are equal to one another. In contrast, the minimum pitch protection logic is dysfunctional when the first and second propeller speed measurements are different from one another.

The method can include determining, by the one or more controllers, that the gas turbine engine is operating at a ground fine setting. In addition, the method can include restoring, by the one or more controllers, the signal indicating the aircraft is operating in the ground mode. The method can also include modifying, by the one or more controllers, the propeller overspeed protection logic. In various embodiments, modifying the propeller overspeed protection logic can include modifying entry and exit tripping points of the propeller overspeed protection logic.

The method can include determining, by the one or more controllers, that the propeller is operating at a low pitch condition. In various embodiments, determining the propeller is operating at the low pitch condition can include obtaining a pitch angle measurement indicating a pitch angle of a blade of the propeller. In addition, determining the propeller is operating at the low pitch condition can include comparing the pitch angle measurement to a reference pitch angle. The propeller is operating at the low pitch condition when the pitch angle measurement is less than the reference pitch angle. Otherwise, the propeller is not operating at the low pitch condition. In some embodiments, the low pitch condition can include a flat pitch condition in which the pitch angle is equal to zero degrees.

The method can include determining the propeller is operating at an overspeed condition. In various embodiments, determining the propeller is operating at the overspeed condition can include obtaining a propeller speed measurement indicating a rotational speed of the propeller. In addition, determining the propeller is operating at the overspeed condition can include comparing the propeller speed measurement to a reference rotational speed. In some embodiments, the reference rotational speed is the modified entry tripping point. The propeller is operating at the overspeed condition when the propeller speed measurement is greater than the modified entry tripping point. Otherwise, the propeller is not operating at the overspeed condition.

The method can include testing propeller overspeed protection logic in response to determining the propeller is operating at the overspeed condition. In various embodiments, testing the propeller overspeed protection logic can include generating a command to adjust the pitch angle; obtaining an additional propeller speed measurement; and comparing the additional propeller speed measurement to a reference rotational speed. In some embodiments, the reference rotational speed is the modified exit tripping point. Accordingly, in such embodiments, the propeller overspeed protection logic is functional when the additional propeller speed measurement is less than the modified exit tripping point. In contrast, the propeller overspeed protection logic is dysfunctional when the additional propeller speed measurement is greater than or equal to the modified exit tripping point.

In various embodiments, testing the propeller overspeed protection logic can include generating a notification indicating the propeller overspeed protection logic is functional or dysfunctional. In some embodiments, the notification is a visual notification presented on a display of an instrument control panel of the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", "third", "fourth", and "fifth" can be used interchangeably to distinguish one component from another and are not intended to signify location or importance of the individual components. In addition, the term "restore" means returning a signal or logic to a former condition or original state.

Example aspects of the present disclosure are directed to systems and methods for testing control logic for a propeller driven by a gas turbine engine of an aircraft. Specifically, in accordance with examples of the present disclosure, the control logic includes minimum pitch protection logic and propeller overspeed protection logic. In addition, an aircraft can include an operator manipulated input device configured to adjust a thrust setting of the gas turbine engine. For example, the operator manipulated input device can be used to operate the gas turbine engine at a predefined thrust setting in which the propeller generates negligible, if any, thrust. As will be described below in greater detail, a controller can be configured to test of the control logic for the propeller when the gas turbine engine is operating at one or more predefined thrust settings.

In some embodiments, the controller can be configured to override a signal when the gas turbine engine is operating at one of the predefined thrust settings. More specifically, the signal can indicate the aircraft is operating in a GROUND mode, and the controller can be configured to manipulate the signal to falsely indicate the aircraft is operating in a FLIGHT mode. As will be discussed later on in more detail, the controller can be configured to test the minimum pitch protection logic when the signal is overridden.

In one example embodiment, the controller obtains a pitch angle measurement indicating a pitch angle of a blade of the propeller. The controller then compares the pitch angle measurement to a reference pitch angle. If the pitch angle measurement is greater than or equal to the reference pitch angle, the controller determines the minimum pitch protection logic is functional. In contrast, if the pitch angle measurement is less than the reference pitch angle, then the controller determines the minimum pitch protection logic is dysfunctional.

Alternatively, or in addition to, the controller can be configured to test operation of propeller overspeed protection logic when the gas turbine engine is operating at one of the predefined settings. As discussed below in more detail, the controller can also be configured to modify the propeller overspeed protection logic.

In one example embodiment, the controller can modify entry and exit tripping points of the propeller overspeed protection logic. In particular, the modified entry tripping point can indicate a transition from a normal operating condition to an overspeed condition, and the modified exit tripping point can indicate a transition from the overspeed condition to the normal operating condition. The controller can obtain a propeller speed measurement from a speed sensor configured to measure the rotational speed of the propeller. In addition, the controller can compare the propeller speed measurement to a reference rotational speed (e.g., the modified entry tripping point) in order to determine whether the propeller is operating at the overspeed condition.

Furthermore, if the controller determines the propeller is operating at the overspeed condition, then the controller can test the propeller overspeed protection logic. More specifically, the controller can generate a command to increase the pitch angle. In addition, the controller can compare additional propeller speed measurements to a reference rotational speed (e.g., modified exit tripping point) until the controller determines one of the additional propeller speed measurements is less than the reference rotational speed.

The systems and methods described herein can provide a number of technical effects and benefits. For instance, using one or more controllers to automatically test control logic for the propeller reduces pilot workload during pre-flight routines. As such, the pilot can direct his or her attention to other, more time-consuming pre-flight tasks. As another benefit, an instrument control panel located in a cockpit of the aircraft may be simplified, because testing control logic for the propeller no longer requires manual controls, such as cabin switches.

Figure 1:
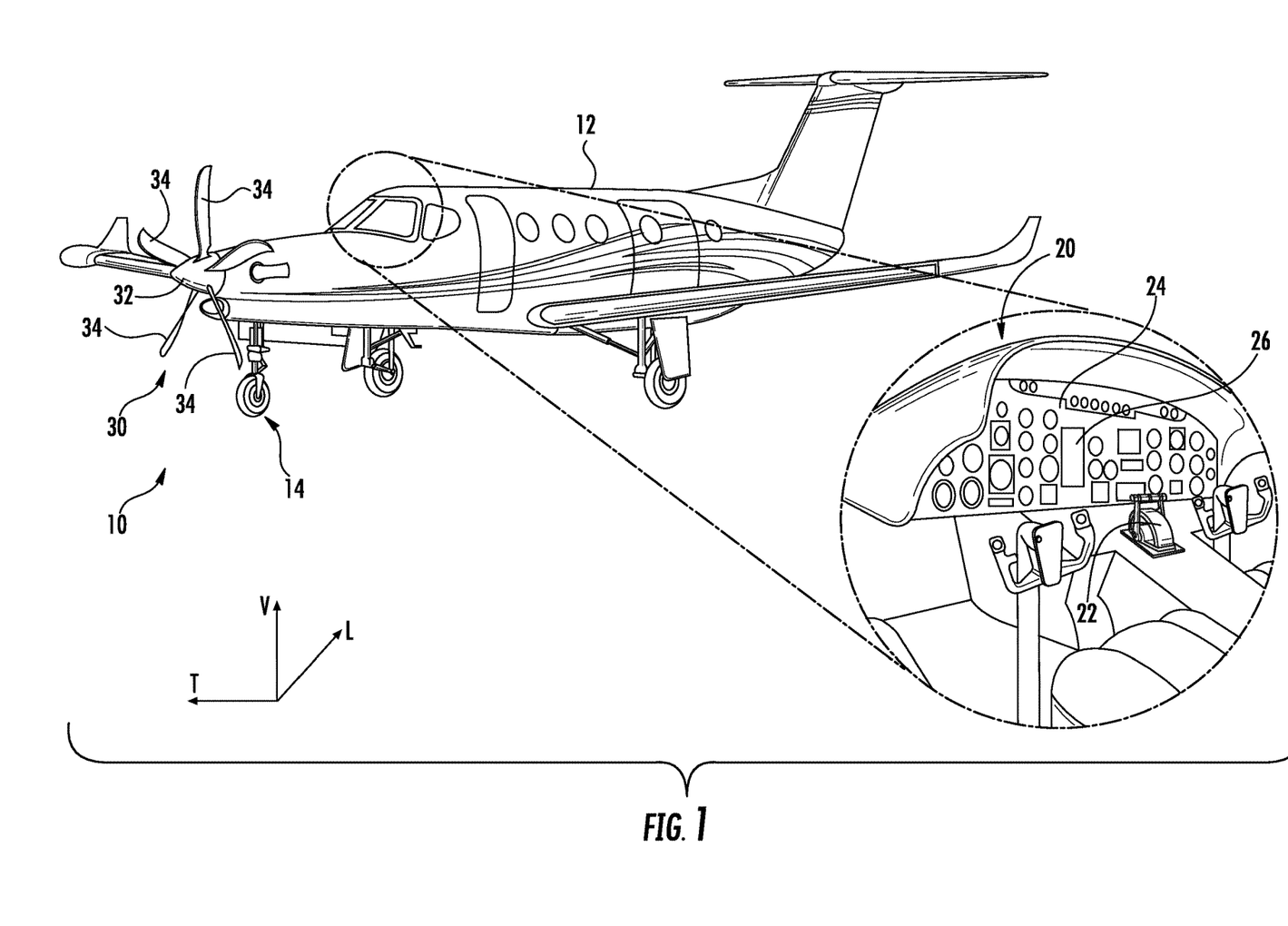
FIG. 1 illustrates a perspective view of an aircraft according to example embodiments of the present disclosure.

Referring now to the drawings, FIG. 1 provides a perspective view of an exemplary aircraft 10 in accordance with example embodiments of the present disclosure. The aircraft 10 defines an orthogonal coordinate system, including three orthogonal coordinate axes. In particular, the three orthogonal coordinate axes include a lateral axis L, a longitudinal axis T, and a vertical axis V. In operation, the aircraft 10 can move along at least one of the lateral axis L, the longitudinal axis T, and the vertical axis V.

Figure 3:
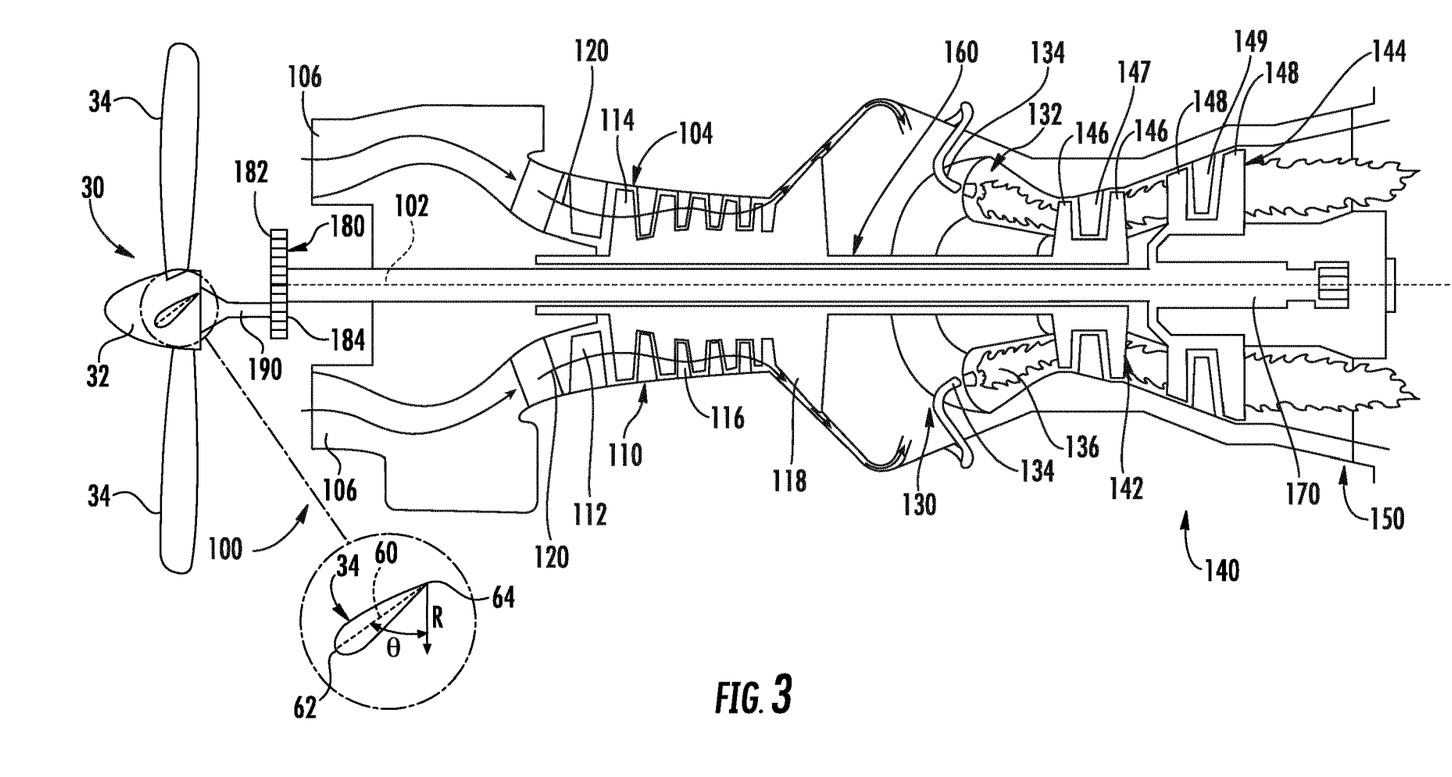
FIG. 3 illustrates a schematic cross-sectional view of a gas turbine engine according to example embodiments of the present disclosure.

In the example embodiment of FIG. 1, the aircraft 10 includes an airframe 12 defining a cockpit 20. The cockpit 20 includes a throttle input device 22 and an instrument control panel 24 having a display 26. The aircraft 10 further includes a propeller 30 comprising a hub 32 and a plurality of blades 34 extending outwardly from the hub 32. Additionally, the aircraft 10 includes a gas turbine engine 100 (FIG. 3). The gas turbine engine 100 generates and transmits power to drive rotation of the propeller 30. In particular, rotation of the propeller 30 generates thrust for the aircraft 10.

Figure 2:
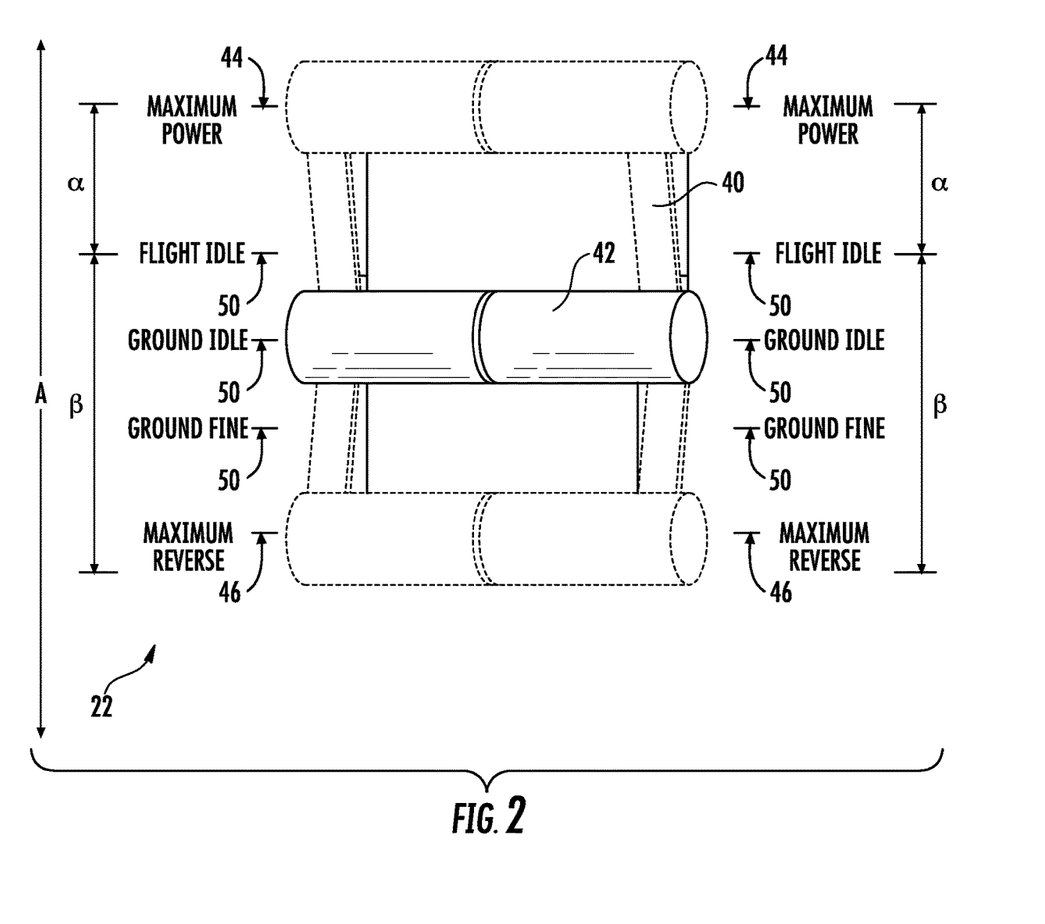
FIG. 2 illustrates a top-down view of a throttle input device according to example embodiments of the present disclosure.

Referring now to FIG. 2, the throttle input device 22 controls engine power of the gas turbine engine 100. In the embodiment depicted, the throttle input device 22 defines an axial direction A, and the throttle input device 22 comprises a lever 40 having a handle 42. As shown, the lever 40 is movable between a first position 44 and a second position 46 along the axial direction A. Accordingly, moving the lever 40 to the first position 44 increases thrust of the aircraft 10 (FIG. 1) in a first direction along the longitudinal axis T. In contrast, moving the lever 40 to the second position 46 increases thrust of the aircraft 10 in a second direction along the longitudinal axis T. It should be appreciated that the first direction is opposite the second direction along the longitudinal axis T.

In the example embodiment depicted, the first position 44 corresponds to a MAXIMUM POWER setting of the gas turbine engine 100, and the second position 46 corresponds to a MAXIMUM REVERSE setting of the gas turbine engine 100. In addition, the throttle input device 22 includes a plurality of intermediate third positions 50 disposed between the first and second positions 44, 46. More specifically, the intermediate third positions 50 can comprise a FLIGHT IDLE setting, a GROUND IDLE setting, and a GROUND FINE setting. The throttle input device 22 can also define an alpha range α and a beta range β. In particular, the alpha range α can comprise any position of the lever 40 that is between the FLIGHT IDLE and MAXIMUM POWER settings along the axial direction A. In contrast, the beta range β can comprise any position of the lever 40 that is between the FLIGHT IDLE and MAXIMUM REVERSE settings along the axial direction A.

It should be appreciated that the propeller 30 generates a negligible amount of thrust, if any, while the gas turbine engine is operating at the GROUND FINE setting. Accordingly, a pilot may not apply the brakes of the aircraft 10 while the gas turbine engine 100 operates at the GROUND FINE setting.

Referring now to FIG. 3, the gas turbine engine 100 defines a longitudinal or centerline axis 102 extending therethrough for reference. The gas turbine engine 100 can generally include a substantially tubular outer casing 104 that defines an annular inlet 106. The outer casing 104 can be formed from a single casing or multiple casings. The outer casing 104 encloses, in serial flow relationship, a gas generator compressor 110, a combustion section 130, a turbine section 140, and an exhaust section 150. The gas generator compressor 110 includes an annular array of inlet guide vanes 112, one or more sequential stages of compressor blades 114, one or more sequential stages of stationary and/or variable guide vanes 116, and a centrifugal compressor 118. Collectively, the compressor blades 114, vanes 116, and the centrifugal compressor 118 define a compressed air path 120.

The combustion section 130 includes a combustion chamber 132 and one or more fuel nozzles 134 extending into the combustion chamber 132. The fuel nozzles 134 supply fuel to mix with compressed air entering the combustion chamber 132. Further, the mixture of fuel and compressed air combust within the combustion chamber 132 to form combustion gases 136. As will be described below in more detail, the combustion gases 136 drive both the compressor 110 and the turbine section 140.

The turbine section 140 includes a gas generator turbine 142 and a power turbine 144. The gas generator turbine 142 includes one or more sequential stages of turbine rotor blades 146 and one or more sequential stages of stator vanes 147. Likewise, the power turbine 144 includes one or more sequential stages of turbine rotor blades 148 and one or more sequential stages of stator vanes 149. Additionally, the gas generator turbine 142 drives the gas generator compressor 110 via a gas generator shaft 160, and the power turbine 144 drives the propeller 30 via a power turbine shaft 170.

More specifically, as shown in the embodiment illustrated in FIG. 3, the gas generator compressor 110 and the gas generator turbine 142 are coupled to one another via the gas generator shaft 160, and the power turbine 144 and the propeller 30 are coupled to one another via the power turbine shaft 170. In operation, the combustion gases 136 drive both the gas generator turbine 142 and the power turbine 144. As the gas generator turbine 142 rotates around the centerline axis 102, the gas generator compressor 110 and the gas generator shaft 160 both also rotate around the centerline axis 102. Further, as the power turbine 144 rotates, the power turbine shaft 170 rotates and transfers rotational energy to the propeller 30 through a gear train 180. More specifically, the gear train 180 can include a first gear 182 and a second gear 184 in mesh with the first 182. The first gear 182 can be connected to the power turbine shaft 170, and the second gear 184 can be connected to a propeller shaft 190. In operation, the gear train 180 can step-down a rotational speed $N_P$ of the power turbine shaft 170. Accordingly, a rotational speed $N_R$ of the propeller shaft 190 can be less than the rotational speed $N_P$ of the power turbine shaft 170.

As shown, the propeller 30 can be rotatably coupled to the propeller shaft 190, and the plurality of blades 34 can be rotatable about a direction R. In addition, each blade of the plurality of blades 34 defines a pitch angle θ between the direction R and a chord 60 extending between leading and trailing edges 62, 64 of each blade.

Figure 4:
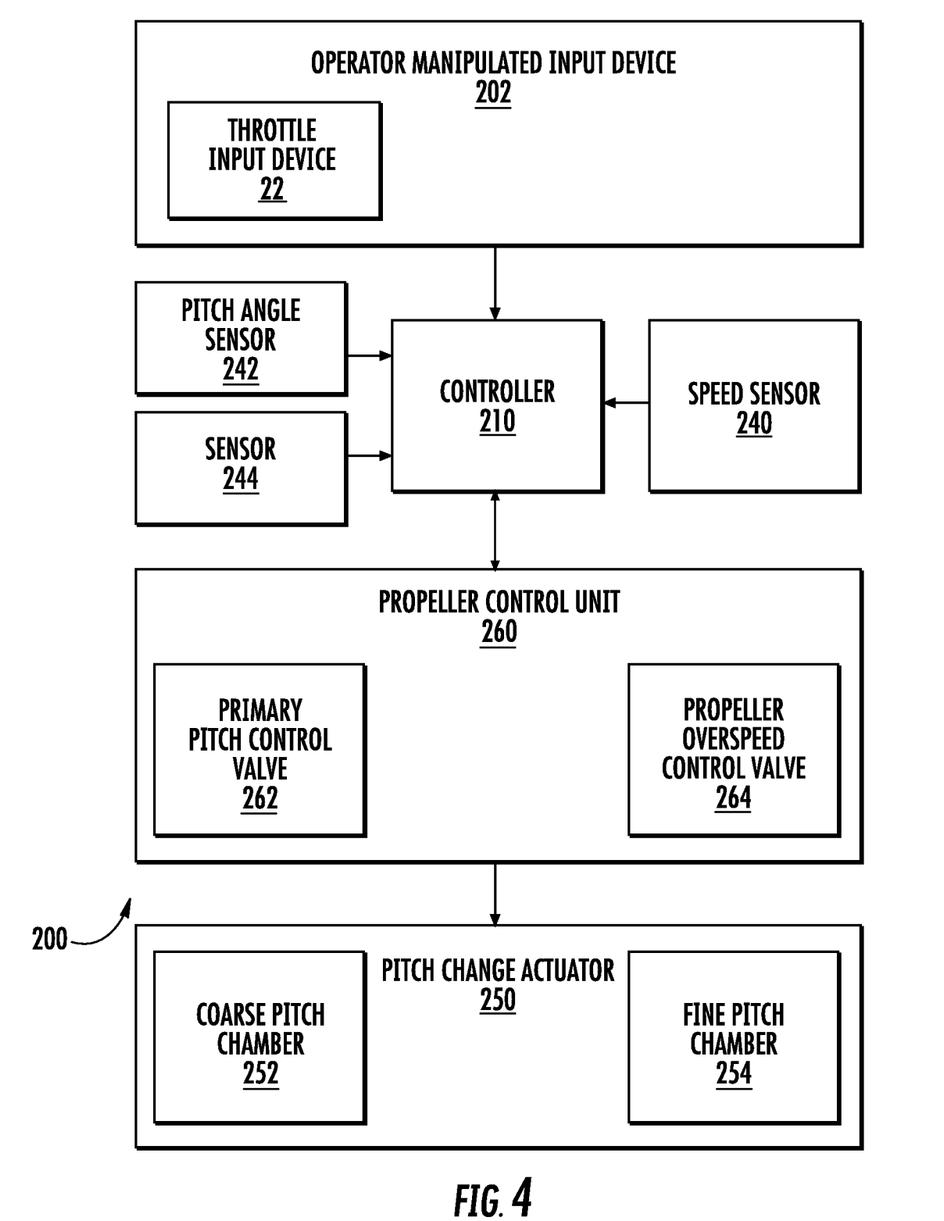
FIG. 4 illustrates a schematic view of a system for control logic for a propeller according to example embodiments of the present disclosure.

Referring now to FIG. 4, an example embodiment of a system 200 for testing control logic for the propeller 30 driven by the gas turbine engine 100 of the aircraft 10 is illustrated in accordance with aspects of the present disclosure. In general, the system 200 will be described with reference to the aircraft 10, the throttle input device 22, and the gas turbine engine 100 described above with reference to FIGS. 1, 2 and 3, respectively. However, in other embodiments, the system 200 can be implemented or used in association with any other suitable aircraft 10 or throttle input device 22.

As shown in FIG. 4, the system 200 can include an operator manipulated input device 202. In one embodiment, the operator manipulated device 202 can comprise the throttle input device 22 (FIG. 1). As will be discussed below in more detail, an operator of the aircraft 10 can use the operator manipulated input device 202 to test operation of the propeller 30 (FIG. 1).

Figure 5:
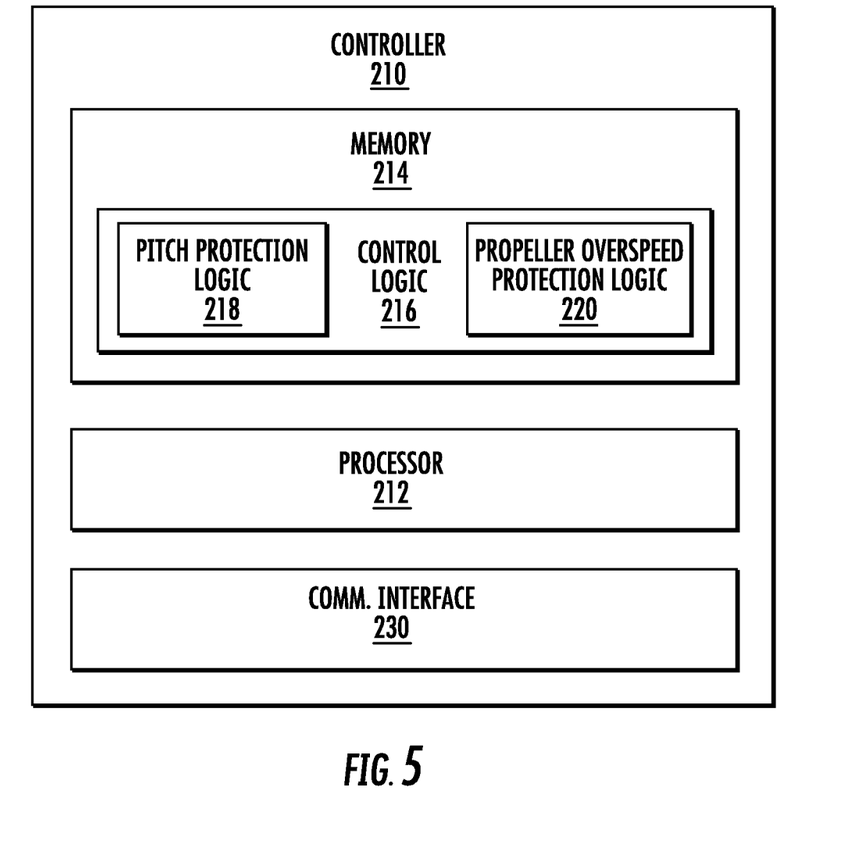
FIG. 5 illustrates a block diagram of one embodiment of a controller according to example embodiments of the present disclosure.

The system 200 can also include a controller 210. In general, the controller 210 can correspond to any suitable processor-based device, including one or more computing devices. For instance, FIG. 5 illustrates one embodiment of suitable components that can be included within the controller 210. As shown in FIG. 5, the controller 210 can include a processor 212 and associated memory 214 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof.

As shown, the controller 210 can include control logic 216 stored in memory 214. In addition, the control logic 216 can include minimum pitch protection logic 218 and propeller overspeed protection logic 220. The minimum pitch protection logic 218, when executed, can configure the controller 210 to maintain the pitch angle θ at or above a reference pitch angle. In one example embodiment, the reference pitch angle corresponds to a minimum pitch angle that the pitch angle θ of the blades 34 must equal or exceed when the aircraft 10 is in flight.

The propeller overspeed protection logic 220, when executed, can configure the controller 210 to reduce a rotational speed of the propeller 30 until the rotational speed of the propeller 30 is less than a reference rotational speed. In one example embodiment, the reference rotational speed corresponds to the rotational speed of the propeller 30 that indicates a transition from a normal operating condition to an overspeed condition (that is, a condition in which the propeller 30 is rotating at a speed beyond its design limits).

It should be appreciated that the controller 210 executes both the minimum pitch protection logic 218 and the propeller overspeed protection logic 220 when the gas turbine engine 100 (FIG. 3) operates at a thrust setting within the alpha range α (FIG. 2). For example, the controller 210 can execute minimum pitch protection logic 218 and propeller overspeed protection logic 220 when the aircraft 10 is in flight. However, the controller 210 can be configured to test both the minimum pitch protection logic 218 and the propeller overspeed protection logic 220 when gas turbine engine 100 (FIG. 3) operates at one or more thrust settings within the beta range β (FIG. 2). Further description of both the minimum pitch protection logic 218 and the propeller overspeed protection logic 220 is provided with reference to the flow diagrams of FIGS. 8 and 9 below.

Additionally, as shown in FIG. 5, the controller 210 can also include a communications interface module 230. In several embodiments, the communications interface module 230 can include associated electronic circuitry that is used to send and receive data. As such, the communications interface module 230 of the controller 210 can be used to receive data from the operator manipulated input device 202. In addition, the communications interface module 230 can also be used to communicate with any other suitable components of the gas turbine engine 100, including any number of sensors configured to monitor one or more operating parameters of the gas turbine engine 100 and/or the propeller 30. It should be appreciated that the communications interface module 230 can be any combination of suitable wired and/or wireless communications interfaces and, thus, can be communicatively coupled to one or more components of the gas turbine engine 100 via a wired and/or wireless connection.

Referring again to FIG. 4, the system 200 includes a speed sensor 240 operable to detect the rotational speed of the propeller 30. In one example embodiment, the speed sensor 240 can be configured to sense the rotational speed $N_P$ of the power turbine shaft 170.

In another example embodiment, the speed sensor 240 can be configured to sense the rotational speed $N_R$ of the propeller shaft 190.

The system 200 can also include a pitch angle sensor 242 operable to detect the pitch angle θ of each blade of the plurality of blades 34. It should be appreciated that both the speed sensor 240 and the pitch angle sensor 242 can be communicatively coupled to the controller 210 via any suitable wired or wireless connection.

The system 200 can also include a sensor 244 operable to detect whether the aircraft 10 is operating in a FLIGHT mode or a GROUND mode. In the FLIGHT mode, wheels 14 (FIG. 1) of the aircraft 10 do not support the weight of the airframe 12. In contrast, when the aircraft 10 is operating in the GROUND mode, the wheels 14 of the aircraft 10 do support the weight of the airframe 12. It should be appreciated that the sensor 244 can be communicatively coupled to the controller 210 via any suitable wired or wireless connection. As such, in one example embodiment, the controller 210 can receive a signal from the sensor 244 indicating whether the aircraft 10 is operating in the FLIGHT or GROUND modes.

The system 200 of FIG. 4 can include a pitch change actuator 250 comprising a coarse pitch chamber 252 and a fine pitch chamber 254. A fluid (e.g., hydraulic fluid, engine oil, etc.) can be directed into or out of the coarse pitch chamber 252 to simultaneously increase the pitch angle θ of each blade of the plurality of blades 34. In contrast, the fluid can be directed into or out of the fine pitch chamber 254 to simultaneously decrease the pitch angle θ of each blade of the plurality of blades 34.

The system 200 can also include a propeller control unit 260 that is communicatively coupled to the controller 210. As shown, the propeller control unit 260 can include a primary pitch control valve 262 and a propeller overspeed valve 264. In operation, the propeller control unit 260 can receive one or more commands from another controller (not shown) to adjust the pitch angle θ of the blades 34 via the primary pitch control valve 262. In one example embodiment, the propeller control unit 260 can operate the primary pitch control valve 262 to direct the fluid into or out of the fine pitch chamber 254. Alternatively, or in addition to, the propeller control unit 260 can operate the primary pitch control valve 262 to direct the fluid into or out of the coarse pitch chamber 252.

It should be appreciated that the primary pitch control valve 262 can be used to adjust the pitch angle θ of each blade of the plurality of blades 34 when the rotational speed of the propeller 30 is operating at a normal operating condition. For example, the primary pitch control valve 262 can adjust the pitch angle θ of the blades 34 when the rotational speed of the propeller 30 is less than the reference rotational speed.

When the propeller 30 is operating at the overspeed condition, the propeller control unit 260 can receive one or more commands from the controller 210 to adjust the pitch angle θ via the propeller overspeed valve 264. In one example embodiment, the propeller control unit 260 can operate the propeller overspeed valve 264 to direct the fluid into or out of the fine pitch chamber 254. Alternatively, or in addition to, the propeller control unit 260 can operate the propeller overspeed valve 264 to direct the fluid into or out of the coarse pitch chamber 252. It should also be appreciated that the propeller overspeed valve 264 overrides operation of the primary pitch control valve 262 when the propeller 30 is operating at the overspeed condition.

Figure 6:
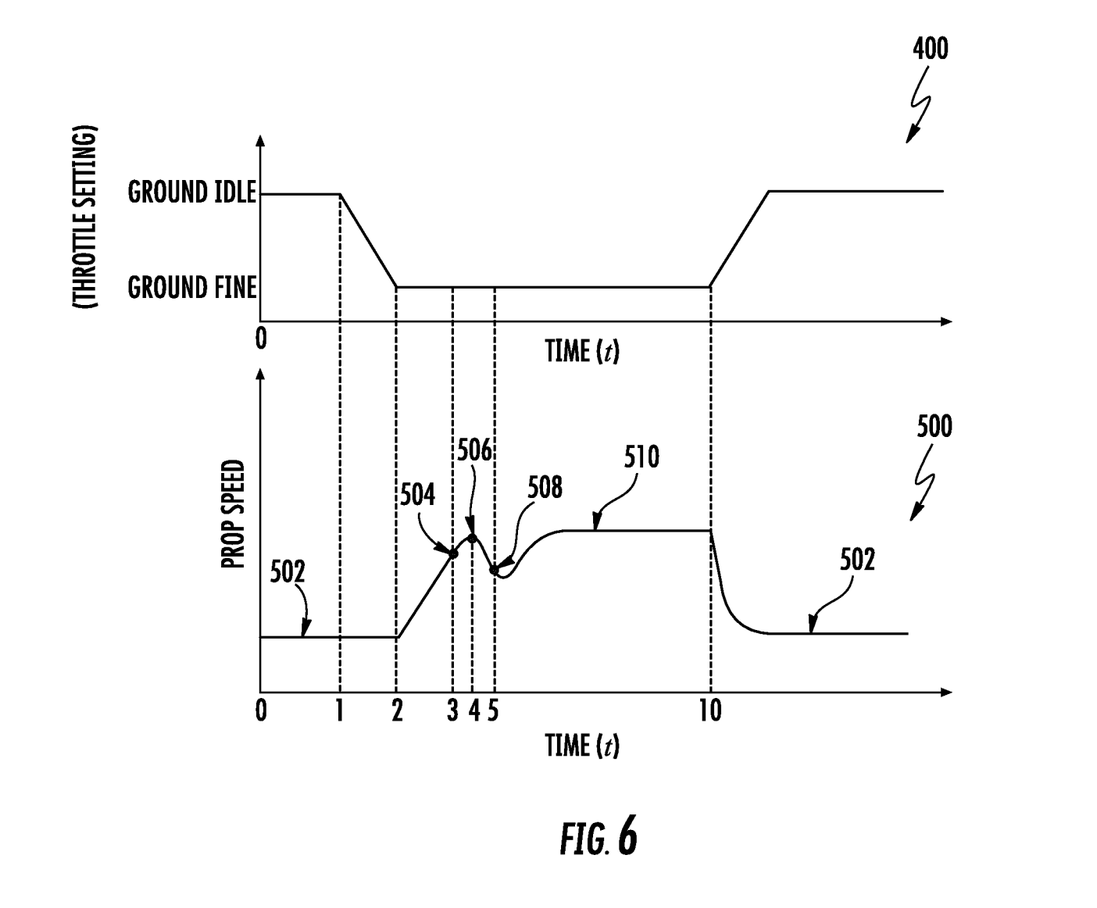
FIG. 6 depicts a graphical representation of testing control logic for a propeller of a gas turbine engine according to example embodiments of the present disclosure.

FIG. 6 illustrates use of the system 200 of FIG. 4 to test control logic 216 for the propeller 30. More specifically, FIG. 6 illustrates use of the system 200 of FIG. 4 to test the minimum pitch protection logic 218 and the propeller overspeed protection logic 220. As shown, FIG. 6 illustrates a first curve 400 and a second curve 500. The first curve 400 illustrates a position of the operator manipulated input device 202 with respect to time (t). More specifically, the first curve 400 illustrates movement of the operator manipulated input device 202 between the GROUND IDLE and GROUND FINE settings. The second curve 500 illustrates a rotational speed of the propeller 30 with respect to time (t). As will be discussed below in more detail, the second curve 500 illustrates automated testing of the propeller overspeed protection logic 220 in response to movement of the operator manipulated input device 202 to the GROUND FINE setting.

At t=0, the controller 210 receives an operator command from the operator manipulated input device 202 indicating the gas turbine engine 100 is operating at a thrust setting within the beta range β. More specifically, the operator command indicates the gas turbine engine 100 is operating at the GROUND IDLE setting. In addition, the controller 210 can receive a signal from the sensor 244 indicating the aircraft 10 is operating in the GROUND mode. At t=1, an operator of the aircraft 10 begins moving the operator manipulated input device 202 from the GROUND IDLE setting to the GROUND FINE setting (also within the beta range β). As will be discussed below in more detail, the controller 210 can be configured to test the minimum pitch protection logic 218 when the gas turbine engine 100 operates at one or more thrust settings within the beta range β.

As the operator moves the operator manipulated input device 202 from the GROUND IDLE setting to the GROUND FINE setting, the controller 210 can override the signal from the sensor 244 in order to allow testing of the minimum pitch protection logic 218. In one example embodiment, the controller 210 can override the signal such that the signal no longer indicates the aircraft 10 is operating in the GROUND mode. More specifically, the controller 210 can manipulate the signal to indicate the aircraft 10 is operating in the FLIGHT mode. Accordingly, the controller 210 can test the minimum pitch protection logic 218, because the signal now indicates the aircraft 10 is operating in the FLIGHT mode.

The minimum pitch protection logic 218, when executed, can configure the controller 210 to maintain the pitch angle θ of the blades 34 at an angle that is greater than or equal to the reference pitch angle, such as the minimum pitch angle required when the aircraft 10 is in flight (e.g., the FLIGHT mode). In one example embodiment, the controller 210 can test the minimum pitch protection logic 218 based, at least in part, on a pitch angle measurement indicating the pitch angle θ of the blades 34. More specifically, the pitch angle measurement can be obtained from the pitch angle sensor 242, and the controller 210 can be configured to compare the pitch angle measurement to the reference pitch angle. If the controller 210 determines the pitch angle measurement is greater than or equal to the reference pitch angle, then the controller 210 can determine the minimum pitch protection logic 218 is functional (that is, the minimum pitch protection logic 218 is functioning as intended). In contrast, if the controller 210 determines the pitch angle measurement is less than the reference pitch angle, the controller 210 can determine the minimum pitch protection logic 218 is dysfunctional (that is the minimum pitch protection logic is not functioning as intended).

It should be appreciated that the controller 210 can test the minimum pitch protection logic 218 based on any suitable data. For example, the controller 210 can test the minimum pitch protection logic 218 based on a propeller speed measurement indicating the rotational speed of the propeller 30. More specifically, the propeller speed measurement can be obtained from the speed sensor 240. In one example embodiment, the controller 210 obtains a first propeller speed measurement and subsequently obtains a second propeller speed measurement. If the second propeller speed measurement is equal to the first propeller speed measurement, then the controller 210 can determine the minimum pitch protection logic 218 is functional. Otherwise, the controller determines the minimum pitch protection logic 218 is dysfunctional. In an alternative embodiment, the controller 210 can monitor an amount of electrical current provided to the pitch change actuator 250.

It should be appreciated that movement of the operator manipulated device 202 from the GROUND IDLE setting to the GROUND FINE setting can generate a request to reduce the pitch angle θ to a value that is below the reference pitch angle. However, it should also be appreciated that the minimum pitch protection logic 218, when executed, can configure the controller 210 to ignore the request to reduce the pitch angle θ to the value that is below the reference pitch angle. For example, the minimum pitch protection logic 218, when executed, can configure the controller 210 to hold the pitch angle θ of the blades 34 at a constant value that is greater than or equal to the reference pitch angle. In addition, the minimum pitch protection logic 218, when executed, can configure the controller 210 to ignore any requests to raise or lower the pitch angle θ.

At t=2, the controller 210 determines the gas turbine engine 100 is operating at the GROUND FINE setting based, at least in part, on an operator command from the operator manipulated input device 202. In addition, the controller 210 stops overriding the signal received from the sensor 244. Accordingly, the signal no longer indicates the aircraft 10 is operating in the FLIGHT mode. Instead, the signal once again indicates that the aircraft 10 is operating in the GROUND mode. It should be appreciated that the controller 210 cannot test operation of the minimum pitch protection logic 218 when the gas turbine engine 100 operates at the GROUND FINE setting and the signal from the sensor 244 indicates the aircraft 10 is operating in the GROUND mode.

In addition, the controller 210 can temporarily modify the propeller overspeed protection logic 220. More specifically, the controller 210 can modify an entry tripping point and an exit tripping point. It should be appreciated that the entry tripping point can correspond to a transition from the normal operating condition to the overspeed condition, and the exit tripping point can correspond to a transition from the overspeed condition to the normal operating condition. In one example embodiment, the modified entry tripping point can correspond to a first rotational speed of the propeller 30, and the modified exit tripping point can correspond to a second rotational speed of the propeller 30. More specifically, the first and second rotational speeds can be threshold values indicating the transition between the normal and overspeed operating conditions. It should be appreciated, however, that the first rotational speed may be different than the second rotational speed.

Still further, beginning at t=2 the pitch angle θ of each blade of the plurality of blades 34 can decrease to any suitable value that is less than the reference pitch angle, because the controller 210 cannot execute the minimum pitch protection logic 218. Accordingly, the controller 210 cannot ignore requests to adjust the pitch angle θ of the blades 34 to a value that is below the reference pitch angle. In one example embodiment, each blade of the plurality of blades 34 can adjust to a flat pitch condition in which the pitch angle θ of each blade is equal to zero degrees (0°). From t=2 to t=3, the rotational speed of the propeller 30 can increase from the first speed 502 to a second speed 504 due, at least in part, to the pitch angle θ adjusting to or towards the flat pitch condition. At t=3, the rotational speed of the propeller 30 is equal to the second speed 504, which is equal to the modified entry tripping point of the propeller overspeed protection logic 220. Accordingly, at t=3 the controller 210 determines the propeller 30 is operating at the overspeed condition. In addition, the controller 210 begins testing the propeller overspeed protection logic 220. In one example embodiment, the controller 210 generates a command to adjust the pitch angle θ of each blade of the plurality of blades 34. More specifically, the command can be to increase the pitch angle θ.

At t=4, the rotational speed of the propeller 30 is equal to a third speed 506 that is greater than the second speed 502. It should be appreciated that the rotational speed of the propeller 30 rises from the second speed 504 to the third speed 506 due to a time delay between when the controller 210 determines the overspeed condition and when the controller 210 activates the propeller overspeed protection logic 220. More specifically, the time delay can include an amount of time that is required to counteract the rise in rotational speed of the propeller 30. For example, as will be discussed below in more detail, the pitch angle θ of the blades 34 can be adjusted to counteract the rise in rotational speed of the propeller 30. In addition, the controller 210, at t=4, obtains a propeller speed measurement from the speed sensor 240, and subsequently compares the propeller speed measurement to the modified exit tripping point.

From t=4 to t=5, the rotational speed of the propeller 30 decreases from the third speed 506 to a fourth speed 508 due, at least in part, to the command to increase the pitch angle θ of the blades 34. Furthermore, since the fourth speed 508 is less than the modified exit tripping point of the propeller overspeed protection logic 220, the controller 210 can end testing of the propeller overspeed protection logic 220.

It should be appreciated that the controller 210 can restore the propeller overspeed protection logic 220 subsequent to determining the rotational speed of the propeller 30 is less than the modified exit tripping point. More specifically, the controller 210 can restore the modified entry and exit tripping points to their original values (that is, the value of the entry and exit tripping points prior to t=2).

Between t=5 and t=10, the rotational speed of the propeller 30 increases to a fifth speed 510 that is substantially equal to the third speed 506. However, the controller 210 does not initiate testing of the propeller overspeed protection logic 510 between t=5 and t=10, because the fifth speed 510 is not greater than or equal to the original entry tripping point. Next, at t=10, the operator of aircraft 10 begins moving the operator manipulated input device 202 from the GROUND FINE setting to the GROUND IDLE setting. Accordingly, the rotational speed of the propeller 30 decreases from the fifth speed 510 to the first speed 502.

Figure 7:
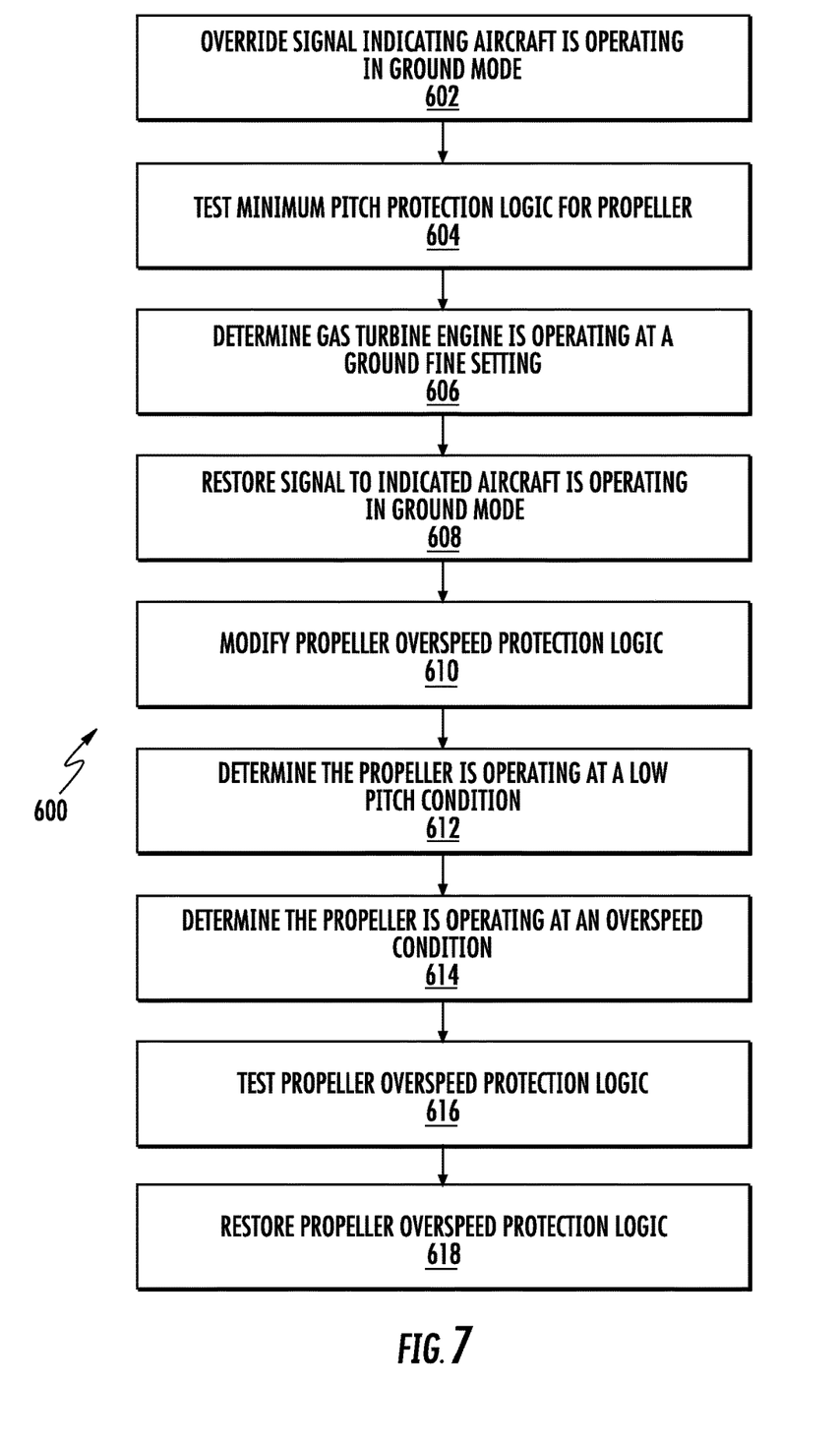
FIG. 7 illustrates a flow diagram of one embodiment of a method for testing control logic for a propeller of a gas turbine engine according to example embodiments of the present disclosure.

FIG. 7 illustrates a flow diagram of one embodiment of a method 600 for testing control logic for a propeller driven by a gas turbine engine of an aircraft. In general, the method 600 will be discussed herein with reference to the system 200 described above with reference to FIGS. 4 and 5 as well as the aircraft 10, throttle input device 22, and gas turbine engine 100 described above with reference to FIGS. 1, 2 and 3, respectively. It should be appreciated, however, that the method 600 is not limited to any particular order or arrangement. As such, one skilled in the art, using the disclosures provided herein, will appreciate that various steps of the method 600 disclosed herein can be omitted, rearranged, combined, performed simultaneously, and/or adapted in various ways without deviating from the scope of the present disclosure.

As shown in FIG. 7, at (602), the method 600 includes overriding a signal received from the sensor 244. More specifically, the signal indicates the aircraft 10 is operating in the GROUND mode, and the one or more controllers 210 manipulate the signal to falsely indicate the aircraft 10 is operating in the FLIGHT mode. Accordingly, the one or more controllers 210 can test the minimum pitch protection logic 218 at (604).

Figure 8:
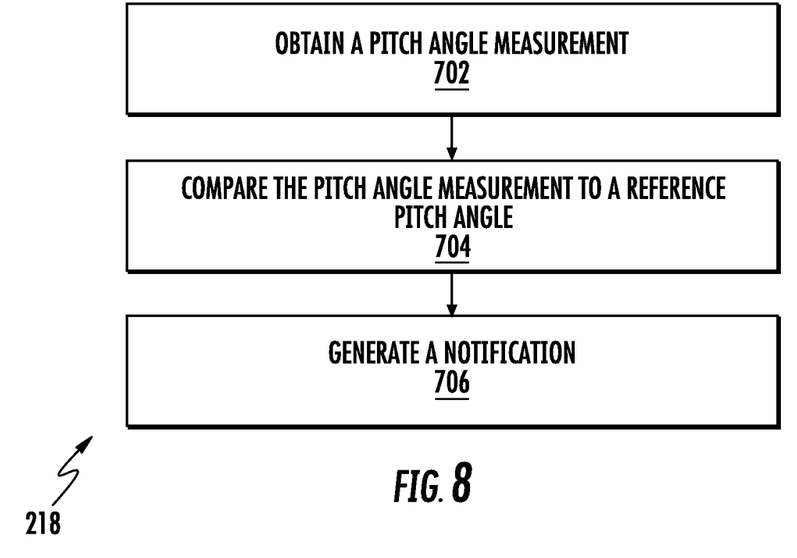
FIG. 8 illustrates a flow diagram of one embodiment of minimum pitch protection logic that may be utilized with the system of FIG. 4.

Referring briefly now to FIG. 8, a flow diagram of one embodiment of the minimum pitch protection logic 218 is provided. As shown at (702), the minimum pitch protection logic 218, when executed, configures the one or more controllers 210 to obtain a pitch angle measurement indicating the pitch angle θ of the blades 34. At (704), the one or more controllers 210 compare the pitch angle measurement to the reference pitch angle, which can be the minimum pitch angle required during flight of the aircraft 10. If the pitch angle measurement indicates the pitch angle of blades 34 is greater than or equal to the reference pitch angle, then the one or more controllers 210 determine the minimum pitch protection logic 218 is functional. In contrast, if the one or more controllers 210 determine the pitch angle θ of the blades 34 is less than the reference pitch angle, then the one or more controllers 210 determine the minimum pitch logic 218 is dysfunctional. In either event, at (706) the one or more controllers 210 can generate a notification indicating that the minimum pitch protection logic 218 is either functional or dysfunctional. In one example embodiment, the notification can be presented on the display 26 of the instrument panel 24.

Referring again to FIG. 7, at (606) the one or more controllers 210 determine that the gas turbine engine 100 is operating at a GROUND FINE setting. In one example embodiment, the one or more controllers 210 can receive an operator command from the operator manipulated input device 202 of the aircraft 10. More specifically, the operator manipulated input device 202 can be the throttle input device 22, and the operator command can indicate that the throttle input device 22 is at the GROUND FINE setting. In addition, at (608) the one or more controllers 210 restore the signal to an original state in which the signal indicates the aircraft 10 is operating in the GROUND mode.

At (610), the one or more controllers 210 modify the propeller overspeed protection logic 220. In one example embodiment, the one or more controllers 210 modify the entry and exit tripping points of the propeller overspeed protection logic 220. More specifically, the modified entry and exit tripping points can be less than the original entry and exit tripping points (that is, the entry and exit tripping points prior to modification). At step (610), the one or more controllers 210 also override a signal that inhibits activation of the propeller overspeed protection logic 220 when the gas turbine engine 100 operates at the GROUND FINE setting. Accordingly, overriding the signal allows the one or more controllers 210 to test the propeller overspeed protection logic 220 when the gas turbine engine 100 operates at the GROUND FINE setting.

In an alternative embodiment, the propeller overspeed logic 220 is prohibited only at settings that are below the GROUND FINE setting along the axial direction A. In particular, the one or more controllers 210 can be configured to override the signal only when the pitch angle θ of the blades 34 is less than zero degrees (that is, below the flat pitch condition). Accordingly, when the gas turbine engine 100 operates at the GROUND FINE setting, the one or more controllers 210 can be configured to test the propeller overspeed protection logic 220 without overriding the signal.

At (612), the one or more controllers 210 determine the propeller 30 is operating at a low pitch condition. In one example embodiment, the one or more controllers 210 obtain a propeller speed measurement indicating the rotational speed of the propeller. In addition, the one or more controllers 210 compare monitor the pitch angle θ of one or more blades 34 of the propeller 30. More specifically, the one or more controllers 210 obtain a pitch angle measurement indicating the pitch angle θ of the blades 34. In one example embodiment, the one or more controllers 210 obtain the pitch angle measurement from the pitch angle sensor 242. In addition, the one or more controllers 210 compare the pitch angle measurement to a reference pitch angle, such as the minimum pitch angle required during flight of the aircraft 10. If the pitch angle measurement indicates the pitch angle of the one or more blades 34 is less than the reference pitch angle, then the one or more controllers 210 determine the propeller 30 is operating at the low pitch condition. Additionally, if the one or more controllers 210 determine the propeller 30 is operating at the low pitch condition, then the one or more controllers 210 proceed to (614). Otherwise, the one or more controllers 210 can continue to monitor the pitch angle of the one or more blades 34 at (606).

It should be appreciated that the low pitch condition may include any suitable range of values that are less than the reference pitch angle. For example, in one embodiment, the low pitch condition may include a pitch angle between four degrees (4°) and minus forty-five degrees (−45°).

At (614), the one or more controllers 210 determine the propeller 30 is operating at the overspeed condition. In one example embodiment, the one or more controllers 210 determine the propeller 30 is operating at the overspeed condition based on a propeller speed measurement indicating the rotational speed of the propeller 30. More specifically, the one or more controllers 210 obtain the propeller speed measurement from the speed sensor 240. In addition, the one or more controllers 210 compare the propeller speed measurement to a reference rotational speed, such as the modified entry tripping point of the propeller overspeed protection logic 220. If the propeller speed measurement is greater than or equal to the modified entry tripping point, then the one or more controllers can test the propeller overspeed protection logic 220 at (616). Otherwise, the one or more controllers 210 can continue to monitor the rotational speed of the propeller 30.

Figure 9:
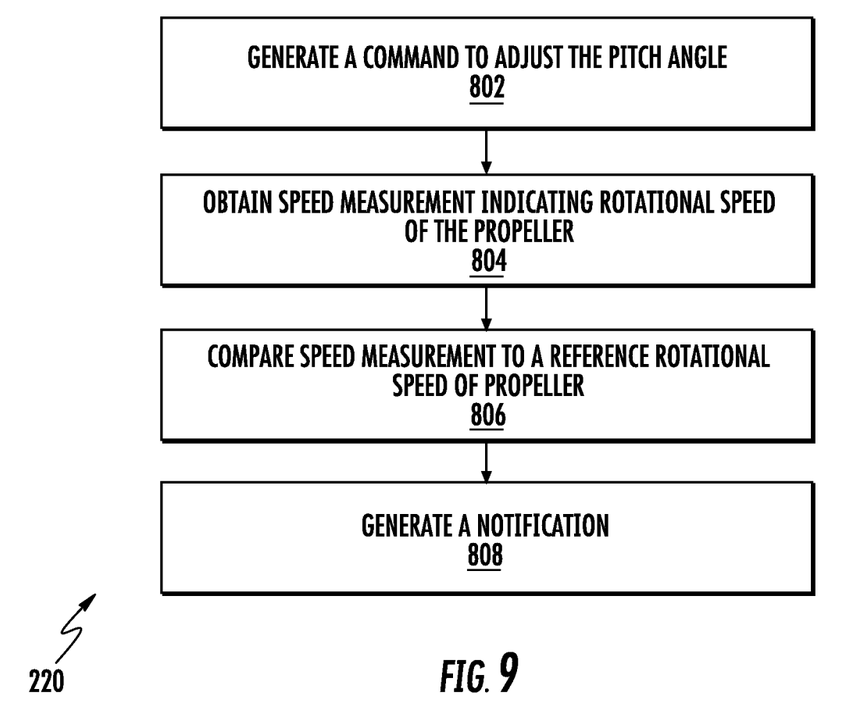
FIG. 9 illustrates a flow diagram of one embodiment of propeller overspeed protection logic that may be utilized with the system of FIG. 4.

Referring briefly now to FIG. 9, a flow diagram of one embodiment of the propeller overspeed protection logic 220 is provided. As shown at (802), the propeller overspeed protection logic 220, when executed, configures the one or more controllers to generate a command to adjust the pitch angle θ of the blades 34. More specifically, the command can be to increase the pitch angle θ of the blades 34. At (804), the one or more controllers 210 obtain an additional propeller speed measurement from the speed sensor 240. Then, at (806), the one or more controllers 210 compare the additional propeller speed measurement to the modified exit tripping point. If the additional propeller speed measurement is less than the modified exit tripping point, the one or more controllers 210 determine the propeller overspeed protection logic 220 is functional. In contrast, if the additional propeller speed measurement is greater than or equal to the modified exit tripping point, the one or more controllers 210 determine the propeller overspeed protection logic 220 is dysfunctional. In either event, at (808) the one or more controllers 210 generate a notification indicating that the minimum pitch protection logic 218 is either functional or dysfunctional. In one example embodiment, the notification can be presented on the display 26 of the instrument panel 24.

Referring now to FIGS. 7 and 9, the one or more controllers 210 can restore the propeller overspeed protection logic 220 at (618). In one example embodiment, the one or more controllers 210 restore the propeller overspeed protection logic 220 subsequent to generating the notification at (808). More specifically, the one or more controllers 210 can restore the modified entry and exit tripping points to original values. For example, the one or more controllers 210 can restore the modified entry tripping point to a first original value that corresponds to the entry tripping point prior to modification. In addition, the one or more controllers 210 can restore the modified exit tripping point to a second original value that corresponds to the exit tripping point prior to modification.

It should be appreciated that the one or controllers 210 can execute the method 600 each time an operator starts the gas turbine engine 100. More specifically, the one or more controllers 210 can execute the method 600 before takeoff. It should also be appreciated that the operator can terminate execution of the method 600 by advancing the operator manipulated input device 202 (i.e., the throttle input device 22) from the GROUND FINE setting to or towards the first position 46 (FIG. 2). In one example embodiment, the operator can terminate execution of the method 600 by advancing the throttle input device 22 form the GROUND FINE setting to the GROUND IDLE setting.

This written description uses examples to disclose the invention, including making and using any devices or systems and performing any incorporated methods. The patentable scope of the invention is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method for testing control logic for a propeller driven by a gas turbine engine of an aircraft, the control logic comprising minimum pitch protection logic and propeller overspeed protection logic, the method comprising:
   overriding, by one or more controllers, a signal indicating the aircraft is operating in a ground mode;
   testing, by the one or more controllers, the minimum pitch protection logic when the signal is overridden;
   determining, by the one or more controllers, that the gas turbine engine is operating at a ground fine setting;
   restoring, by the one or more controllers, the signal to an original state in which the signal indicates the aircraft is operating in the ground mode; and
   modifying, by the one or more controllers, the propeller overspeed protection logic;
   determining, by the one or more controllers, that the propeller is operating at a low pitch condition when the gas turbine engine is operating at the ground fine setting;
   determining, by the one or more controllers, that the propeller is operating at an overspeed condition when the gas turbine engine is operating at the ground fine setting; and
   testing, by the one or more controllers, the propeller overspeed protection logic in response to determining the propeller is operating at the overspeed condition.

2. The method of claim 1, wherein overriding the signal includes manipulating, by the one or more controllers, the signal to indicate the aircraft is operating in a flight mode.

3. The method of either of claim 1, wherein testing the minimum pitch protection logic comprises:
   obtaining, by the one or more controllers, a pitch angle measurement indicating a pitch angle of a blade of the propeller; and
   comparing, by the one or more controllers, the pitch angle measurement to a reference pitch angle;
   wherein the minimum pitch protection logic is functional when the pitch angle measurement is greater than or equal to the reference pitch angle; and
   wherein the minimum pitch protection logic is dysfunctional when the pitch angle measurement is less than the reference pitch angle.

4. The method of claim 1, wherein testing the minimum pitch protection logic comprises:
   obtaining, by the one or more controllers, a first propeller speed measurement indicating a rotational speed of the propeller;
   obtaining, by the one or more controllers, a second propeller speed measurement indicating the rotational speed of the propeller; and
   comparing, by the one or more controllers, the first and second propeller speed measurements;
   wherein the minimum pitch protection logic is functional when the first and second propeller speed measurements are equal to one another; and
   wherein the minimum pitch protection logic is dysfunctional when the second propeller speed measurement is different than the first propeller speed measurement.

5. The method of claim 1, wherein modifying the propeller overspeed protection logic includes modifying, by the one or more controllers, entry and exit tripping points of the propeller overspeed protection logic.

6. The method of claim 5, wherein determining that the propeller is operating at the low pitch condition comprises:
   obtaining, by the one or more controllers, a pitch angle measurement indicating a pitch angle of a blade of the propeller; and
   comparing, by the one or more controllers, the pitch angle measurement to a reference pitch angle;
   wherein the propeller is operating at the low pitch condition when the pitch angle measurement is less than the reference pitch angle.

7. The method of claim 6, wherein the low pitch condition comprises a flat pitch condition in which the pitch angle is equal to zero degrees.

8. The method of claim 6, wherein determining the propeller is operating at the overspeed condition comprises:
   obtaining, by the one or more controllers, a propeller speed measurement indicating a rotational speed of the propeller;
   comparing, by the one or more controllers, the propeller speed measurement to the modified entry tripping point; and
   determining, by the one or more controllers, that the propeller is operating at the overspeed condition when the propeller speed measurement is greater than or equal to the modified entry tripping point.

9. The method of claim 8, wherein testing the propeller overspeed protection logic further comprises:
   generating, by the one or more controllers, a command to adjust the pitch angle;
   obtaining, by the one or more controllers, an additional propeller speed measurement; and
   comparing, by the one or more controllers, the additional propeller speed measurement to the modified exit tripping point;
   wherein the propeller overspeed protection logic is functional when the additional propeller speed measurement is less than the modified exit tripping point; and wherein the propeller overspeed protection logic is dysfunctional when the additional propeller speed measurement is greater than or equal to the modified exit tripping point.

10. The method of claim 9, wherein testing the propeller overspeed protection logic further comprises generating, by the one or more controllers, a notification indicating the propeller overspeed protection logic is functional or dysfunctional, and wherein the notification includes a visual notification presented on a display of an instrument control panel of the aircraft.

11. The method of claim 1, further comprising restoring, by the one or more controllers, the propeller overspeed protection logic.

12. A system for testing control logic for a propeller driven by a gas turbine engine of an aircraft, the control logic comprising minimum pitch protection logic and propeller overspeed protection logic, the system comprising:
    a speed sensor operable to measure a rotational speed of the propeller;
    a pitch angle sensor operable to measure a pitch angle of a blade of the propeller;
    one or more processors communicatively coupled to both the speed sensor and the pitch angle sensor; and
    one or more memory devices, the one or more memory devices storing computer-readable instructions that, when executed by the one or more processors, cause the one or more processors to perform operations, the operations comprising:
    overriding a signal indicating the aircraft is operating in a ground mode;
    testing the minimum pitch protection logic when the signal is overridden;
    determining the gas turbine engine is operating at a ground fine setting;
    restoring the signal to an original state when the gas turbine engine is operating at the ground fine setting;
    modifying the propeller overspeed protection logic when the gas turbine engine is operating at the ground fine setting;
    determining the propeller is operating at an overspeed condition when the gas turbine engine is operating at the ground fine setting; and
    testing the propeller overspeed protection logic in response to determining the propeller is operating at the overspeed condition.

13. The system of claim 12, wherein testing the minimum pitch protection logic comprises:
    obtaining a pitch angle measurement indicating the pitch angle; and
    comparing the pitch angle measurement to a reference pitch angle;
    wherein the minimum pitch protection logic is functional when the pitch angle measurement is greater than or equal to the reference pitch angle; and
    wherein the minimum pitch protection logic is dysfunctional when the pitch angle measurement is less than the reference pitch angle.

14. The system of claim 12, wherein modifying the propeller overspeed protection logic includes adjusting entry and exit tripping points of the propeller overspeed protection logic.

15. The system of claim 12, wherein determining the propeller is operating at the overspeed condition comprises:
    obtaining a propeller speed measurement indicating a rotational speed of the propeller;
    comparing the propeller speed measurement to the modified entry tripping point; and
    determining the propeller is operating at the overspeed condition when the propeller speed measurement is greater than or equal to the modified entry tripping point.

16. The system of claim 12, wherein testing the propeller overspeed protection logic further comprises:
    generating a command to adjust the pitch angle;
    obtaining an additional propeller speed measurement; and
    comparing the additional propeller speed measurement to the modified exit tripping point;
    wherein the propeller overspeed protection logic is functional when the additional propeller speed measurement is less than the modified exit tripping point; and
    wherein the propeller overspeed protection logic is dysfunctional when the additional propeller speed measurement is greater than or equal to the modified exit tripping point.

17. The system of claim 16, wherein testing the propeller overspeed protection logic further comprises generating a notification indicating the propeller overspeed protection logic is functional or dysfunctional, and wherein the notification includes a visual notification presented on a display of an instrument control panel of the aircraft.

18. The system of claim 12, wherein the operations further comprise determining the propeller is operating at a low pitch condition when the gas turbine engine is operating at the ground fine setting.

19. The system of claim 18, wherein determining that the propeller is operating at the low pitch condition comprises:
    obtaining a pitch angle measurement indicating the pitch angle; and
    comparing the pitch angle measurement to a reference pitch angle;
    wherein the propeller is operating at the low pitch condition when the pitch angle measurement is less than the reference pitch angle.

20. The system of claim 12, wherein the operations further comprise restoring the propeller overspeed protection logic.

* * * * *